May 5, 1970       M. H. OLSON       3,510,455
FLUORINATED AMIDO RESIN PREPOLYMERS AND PRODUCTS
Filed Jan. 16, 1967
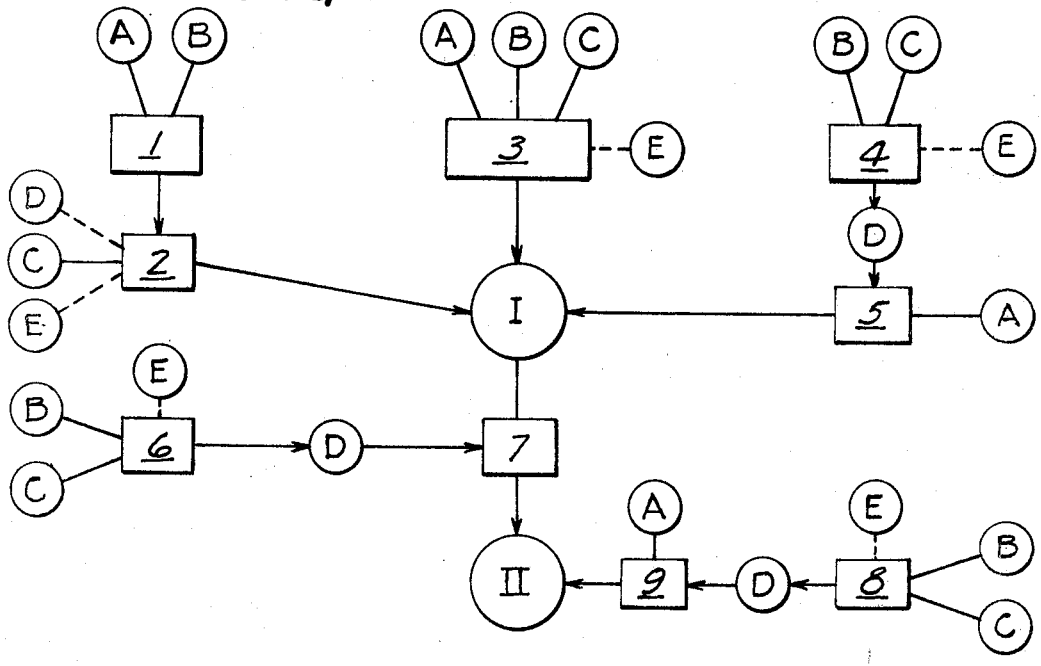
FIG. 1
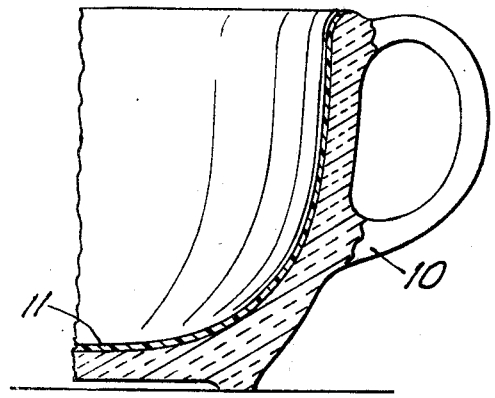
FIG. 2
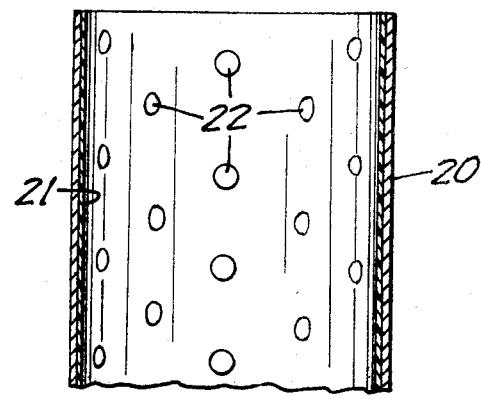
FIG. 4
FIG. 3
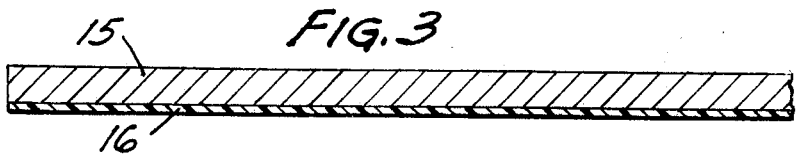
INVENTOR.
MAYNARD H. OLSON
BY
Carpenter, Kinney & Boulter
ATTORNEYS

United States Patent Office 3,510,455
Patented May 5, 1970

3,510,455
FLUORINATED AMIDO RESIN PREPOLYMERS AND PRODUCTS
Maynard H. Olson, St. Paul, Minn., assignor to Minnesota Mining and Manufacturing Company, St. Paul, Minn., a corporation of Delaware
Filed Jan. 16, 1967, Ser. No. 609,484
Int. Cl. C08g 9/30, 9/04; B27k 3/34
U.S. Cl. 260—67.6                                    26 Claims

ABSTRACT OF THE DISCLOSURE

The invention involves a new class of low molecular weight fluorinated prepolymers which characteristically can be polymerized to continuous, adherent, organic solvent insoluble, amido resin films on polar, solid surfaces. Such prepolymers can be made by reacting together under liquid phase conditions an aldehyde, a fluorinated aliphatic compound, and a nitrogen containing compound. Articles so coated have unexpectedly improved properties.

---

This invention relates to a new and very useful class of thermosettable fluorinated aliphatic radical containing amido resin prepolymers, to the cured polymers produced therefrom, to articles of manufacture coated with such prepolymers and with such cured polymers, and to methods for making same.

As is known in the art, cured amido resin polymers are widely used in molding with such materials as alpha cellulose, wood flour or mineral powders as fillers. These polymers are also extensively used in processes for coating, for laminating, for textiles and paper treatment, and for leather processing. Highly crosslinked, cured amido resin polymers are known for their hardness, wear resistance and solvent resistance. They are characteristically at least slightly hydrophilic and/or oleophilic. These cured amido resin polymers are commonly prepared from monomeric amido resin precursers. An especially common such precurser is hexamethoxymethylmelamine.

Because of the well-known hydrophobic and/or oleophobic character of various fluorocarbon compounds, efforts have been heretofore made to combine fluorinated aliphatic groups with such monomeric amido resin precursers so as to produce hydrophobic and/or oleophobic cured amido resin polymers. It has been found substantially impossible, however, to produce a satisfactory fluorinated product. Thus, although some N-perfluoroalkyl substituted polymerizable triazine monomers are known to the art (see, for example. Wear and Ahlbrecht U.S. Pat. No. 3,128,272, or Shaw U.S. Pat. No. 3,162,633), so far as known to me, such fluorine-containing amido resin precursers not only require for preparation a complex series of synthetic steps, including in some cases expensive and unusual chemical intermediates, but also, when such fluorinated resin precursers are homopolymerized, the product polymer has properties generally inferior to those of the non-fluorinated equivalents, especially as respects hardness and wear resistance.

On the other hand, when monomeric fluorine-containing amido resin precursers are attempted to be copolymerized with monomeric fluorine-free amido resin precursers, the resulting cured copolymers not only are nontransparent (translucent), but also are incapable of forming continuous films. True copolymerization usually does not occur between such mixtures, presumably owing to poor mutual solubility of the two classes of compounds. Thus, for example, when fluorinated polymerizable triazine monomers are first admixed with nonfluorinated polymerizable triazine monomers to form a mixture which is then coated upon a solid polar substrate and polymerized thereon to provide a cured polymer coating, the resulting cured coating is customarily found to comprise a two-phased discontinuous, nontransparent (translucent), solid structure composed of two independent polymeric substances. Apparently, the fluorine-containing component, during curing, and possibly also during the preliminary drying (if the coating is applied from solution), deposits separately upon the substrate and provides an organophobic base film which then causes the fluorine-free component to coalesce, as it polymerizes, into small discrete regions on such base film. By the present invention, there is provided a class of fluorine-containing amido resin prepolymers in copolymer form which can first be coated on solid, polar substrates and then thermoset to a solid, continuous, adherent film which is not only transparent but also has excellent hardness, wear resistance, hydrophobicity, and oleophobicity.

It is accordingly an object of the present invention to provide new fluorine-containing amido resin prepolymers.

Another object is to provide processes for making such prepolymers.

Another object is to provide thermoset cured polymer products from such prepolymers, such polymers being adherent to polar surfaces and having excellent hardness, wear resistance, hydrophobicity and oleophobicity.

Another object is to provide processes for producing such cured polymers from such prepolymers.

Another object is to provide mixtures of such fluorine-containing prepolymers and fluorine-free prepolymers which can be thermoset to a solid, continuous, adherent film.

Another object is to provide new and improved articles of manufacture.

Another object is to provide dinnerware having superior resistance to tea filming and coffee staining.

Another object is to provide skis having improved sliding properties.

Another object is to provide improved heat exchange equipment, especially condensers.

Other and further objects will become apparent to those skilled in the art from a reading of the present specification taken together with the attached diagrammatic drawings wherein:

FIG. 1 is a flow sheet, illustrating production of the fluorine-containing amido resin prepolymers of this invention;

FIG. 2 is a vertical cross sectional view through a conventional plastic coffee cup wall fragment which has been coated with a thermoset cured polymer prepared using a fluorine-containing amido resin prepolymer of this invention;

FIG. 3 is a vertical cross-sectional view through a portion of a conventional ski whose ground-engaging surface has been coated with a thermoset cured polymer prepared using a fluorine-containing amido resin prepolymer of this invention; and FIG. 4 is a diagrammatic vertical cross-sectional view through a portion of a heat-exchange condenser tube whose cold face has been coated with a thermoset cured polymer prepared using a fluorine-containing amido resin prepolymer of this invention.

The amido resin prepolymers of this invention comprise the polymerizable reaction product of an aldehyde, a fluorinated aliphatic compound containing active hydrogen and a nitrogen containing compound, as more particularly defined hereinafter.

STARTING MATERIALS

The prepolymer products of this invention are produced by interreacting the following three classes of starting materials:

(a) an aldehyde (b) a fluorinated aliphatic compound containing active hydrogen
(c) an amino compound These materials may all be reacted together in the same reaction mixture, or the aldehyde may be initially reacted with either the nitrogen containing compound or the fluorocarbon reactant and subsequently reacted with the third compound.

For purposes of this invention, an aldehyde is an organic compound of the formula (1)  R'CHO wherein R' is hydrogen or an organic radical, and may include one or more aldehyde (CHO) groups and is free of active hydrogen atoms. Preferably R' is an alkyl radical of not more than 6 carbon atoms. More preferably, R' is a lower alkyl group of the class $C_nH_{2n+1}$, where $n$ is an integer of from 1 to 4. The aldehyde may be introduced into the reaction mixture of starting materials either as a monomeric material or as the equivalent polymeric material which is convertible under condensation conditions to the monomeric aldehyde. Suitable aldehydes (and materials capable of forming aldehydes) include benzaldehyde
furfuraldehyde (furfural)
tetrahydrofurfuraldehyde
butyraldehyde
propionaldehyde
acetaldehyde
paraldehyde
paraformaldehyde
trioxane
glyoxal
glutaraldehyde The more preferred aldehyde is formaldehyde.

For purposes of this invention, a fluorinated aliphatic compound containing active hydrogen is an organic compound which contains per molecule both a fluorinated aliphatic group and at least one functional group containing an active hydrogen atom. The term "active hydrogen" as used herein refers to a hydrogen atom which is capable of reaction with formaldehyde in alkaline, neutral, or acid aqueous solution or suspension at temperatures between about 0° C. and 100° C. to form simple methylol or methylene derivatives (see, for example, in the monograph "Formaldehyde," 3rd Edition by J. Frederick Walker, published by Reinhold Publishing Corporation in 1964, p. 218).

The fluorinated aliphatic compound can be considered to comprise three portions: (a) at least one monovalent fluorinated aliphatic radical ($R_f$); (b) at least one monovalent functional terminal group $[X(H)_p]$; and (c) an appropriate linking group or groups (Q) as necessary to interconnect such fluorinated aliphatic radicals(s) with such terminal group(s). Mixtures of such reactants can be employed. A class of such a reactant may be represented by the general formula (2)  $(R_f)_m(Q)_n[X(H)_p]_r$ in which $m$, $n$, $r$, and $p$ are each integers, and $m$ is 1 or 2; $n$ is 0 or 1; $r$ is 1, 2, 3, 4, or 5; and $p$ is 1 or 2.

The fluorinated aliphatic radical ($R_f$) is a monovalent fluorinated saturated non-aromatic aliphatic radical having at least 3 carbon atoms in the skeletal chain. This chain may be straight, branched or cyclic, and may be interrupted by divalent oxygen atoms or trivalent nitrogen atoms bonded only to carbon atoms. Preferably the chain does not contain more than one nitrogen atom or one oxygen atom for every two carbon atoms in the skeletal chain. A perfluoroalkyl radical is preferred, but an occasional hydrogen or chlorine atom may be present as substituents in the fluorinated aliphatic radical provided both that not more than one such non-fluorine substituent is present in such radical for every two carbon atoms, and that such radical contains a terminal perfluoroalkyl group. "Terminal" in this connection refers to the position in the skeletal chain of the radical which is furthest removed from the functional group. Preferably such a radical contains not more than 20 carbon atoms since such a large radical results in inefficient use of the fluorine content.

The functional terminal group $[X(H)_p]$ is a monovalent radical in which H indicates an active hydrogen atom, and in which the integer $p$ (as indicated) is either 1 or 2. Typical appropriate functional groups $[X(H)_p]$ include hydroxyl (—OH),
primary and secondary amino (—NHR),
mercapto (—SH),
carboxyl (—COOH),
primary and secondary carbonamido (—CONHR), and
primary and secondary sulfonamido (—SO$_2$NHR).

In such functional groups, H is an active hydrogen atom (that is, one which is reactable with formaldehyde), and R is either hydrogen or an organic radical, such as a lower alkyl radical of not more than 6 carbon atoms; for example, a methyl group.

The polyvalent linking group (Q) of the fluorinated aliphatic compound when present is free from active hydrogen and includes such polyvalent (including divalent) radicals as sulfonamido, carbonamido, monosubstituted trivalent nitrogen, oxygen, or alkylene or some combination thereof.

Examples of Q include oxa (—O—)

carbonyl $(-\overset{O}{\underset{\|}{C}}-)$ carbonyloxy $(-\overset{O}{\underset{\|}{C}}-O-)$ thia (—S—)

sulfoxy $(-\overset{O}{\underset{\|}{S}}-)$ sulfonyl $(-\overset{O}{\underset{\underset{O}{\|}}{S}}-)$ benzenesulfonamido —C$_6$H$_4$—SO$_2$—NR— amino —N—
           |
           H alkylamino —N—
            |
            C$_n$H$_{2n+1}$ alkylenimino —N—
              |
              C$_n$H$_{2n}$— alkylene —(C$_n$H$_{2n}$)— polyvalent paraffinic —C$_n$H$_{2n}$—CH—CH—CH$_3$
                              |    | alkylidene C$_n$H$_{2n+1}$—CH

In these examples, $n$ is an integer of from 0 to about 20.

When the linking group is a paraffinic radical (divalent or polyvalent), it can contain from 1 up to 15 or more carbon atoms. When more than about 15 carbon atoms are present in such radical, an undesirably large $R_f$ group is necessary in order to overcome the oleophilic tendencies associated with the large number of carbon atoms.

Examples of suitable fluorinated aliphatic compounds include $C_5F_{11}(CH_2)_3OCH_2CHOHCH_2OH$ $C_8F_{17}COCH_2CH_2OH$ $C_2F_5CF\underset{CF_2CF_2}{\overset{CF_2CF_2}{\diagup\hspace{-0.2em}\diagdown}}NCF_2CF_2CO_2CH_2CHOHCH_2OH$ $C_5F_{11}(CH_2)_3SCH_2CHOHCH_2OH$ $C_8F_{17}COCH_2CH_2OH$ $C_8F_{17}SO_2CH_2CH_2OH$ $C_3F_7CH_2NH_2$ $(C_4F_9\overset{O}{\underset{\|}{C}})_2NCH_2CH_2NH_2$ $C_8F_{17}(CH_2)_{11}N(C_2H_5)H$ $C_8F_{17}(CH_2)_{11}N(C_2H_5)C_2H_4OH$ $C_8F_{17}(CH_2)_{11}N(C_2H_4OH)_2$ $C_8F_{17}CH_2CH_2C(CH_2OH)_3$ $CF_3C(CF_2H)F(CF_2)_{10}(CH_2)_2OH$ $CF_3C(CF_2Cl)F(CF_2)_{10}(CH_2)_2OH$ $C_3F_7CH_2OH$ $C_9F_{19}SO_2N(CH_3)CH_2OH$ $C_8F_{17}SO_2N(CH_3)(CH_2)_5SH$ $C_2F_5CF\underset{\underset{CF_2CF_2}{\diagup}}{\overset{\overset{CF_2CF_2}{\diagdown}}{\phantom{X}}}FCCF_2CF_2SO_2NH_2$ $C_8F_{17}SO_2N(CH_3)CH_2CH_2CH_2OH$ $C_8F_{17}(CH_2)_{11}CH_2OH$ $C_8F_{17}CON(C_2H_5)(CH_2)_2OH$ $C_8F_{17}CON(CH_3)(CH_2)_{11}OH$ $CF_3CF_2-\overset{F}{\underset{|}{C}}-\overset{F_2}{C}$
$\phantom{CF_3CF_2-}O\phantom{-}NCF_2CF_2SO_2N(C_2H_5)CH_2CHOHCH_2OH$
$CF_3CF_2-\underset{F}{\underset{|}{C}}-\overset{F_2}{C}$ $C_{12}F_{25}SO_2N(CH_3)CH_2CO_2H$ $CF_3CF_2(OCF_2CF_2)_3OCF_2CON(CH_3)CH_2CHOHCH_2OH$ $C_{12}F_{25}CON(C_2H_5)(CH_2)_3NH_2$ $C_{12}F_{25}CONH(CH_2)_2OH$ $C_8F_{17}SO_2N(CH_3)CH_2NH(CH_2)_2NH(CH_2)_2NH_2$ $C_8F_{17}SO_2N(C_2H_5)CH_2CHOHCH_2OH$ $C_{14}F_{29}SO_2N(CH_3)C_2H_4NHC_2H_4NHC_2H_4NH_2$ $C_4F_9CONHCH_2CH_2C(CH_2OH)_3$ $C_8F_{17}SO_2N(CH_2CH_2OH)_2$ $C_8F_{17}SO_2NHCH_3$ $C_{10}F_{21}CONH_2$ $C_8F_{17}SO_2\overset{H}{\underset{|}{N}}CH_2CH_2CH_2OH$ Some suitable fluorinated aliphatic compounds and methods for their preparation are shown in the following patents: U.S. 3,217,035, 3,171,861, 3,088,049, 2,951,051, 2,809,990, 2,803,656, 2,795,615, 2,691,043, 2,666,797.

While fluorinated aliphatic compounds containing a single active hydrogen-containing group such as alkanols are useful and provide prepolymer molecules of the invention, fluorinated aliphatic compounds containing two or more active hydrogen groups such as alkane diols are generally more readily (compared with those containing only a single active hydrogen atom) converted to prepolymer molecules which form uniform cured coatings and so such compounds may be preferred for some purposes.

For purposes of this invention, a nitrogen containing compound is an organic compound which contains per molecule at least one occurrence of the radical (3) $\quad Y=\overset{\overset{H}{|}}{C}-NR$ In this radical, R is hydrogen or a lower aliphatic radical of less than 6 carbon atoms, and Y is a divalent oxygen atom, NH, or a trivalent nitrogen atom which is a member of a hydrolytically stable, heterocyclic ring structure, such as one containing a completely conjugated system of alternating single and double bonds (e.g., a symmetrical triazine ring). Also, in this radical, the C carbon atom has its fourth valence bond attached to a carbon atom, a nitrogen atom, or a hydrogen atom. When R is lower aliphatic radical, such may contain substituents which are unreactive with formaldehyde, such as halogen, alkoxy, ester, nitro, e.g., but in general these substituents serve no functional purpose in this invention and only increase the cost of the product. If formaldehyde reactive substituents are present in such radical, then these can, under the conditions of prepolymer formation, enter into the condensation reaction to further increase the degree of cross linking in the final product.

Preferred nitrogen containing compounds contain per molecule at least two occurrences of such radical (3) above, and still more preferred nitrogen containing compounds are those where, in such radical, Y is a trivalent nitrogen atom of a six-membered heterocyclic ring, and R is hydrogen or alkyl.

It will be appreciated that mixtures of nitrogen containing compounds can be used. In such a mixture at least 90% of all nitrogen containing compound molecules must contain two or more active hydrogen atoms per molecule, each such hydrogen atom being directly attached to the same or different nitrogen atoms in each molecule. In such a mixture up to about 10% of nitrogen compounds may contain only a single such active hydrogen atom. Such single active hydrogen-containing compounds act as chain-terminating agents, and their presence may even be desirable, as when one desires to impart improved impact resistance to a cured amido resin polymer product derived from a prepolymer product of the invention.

Examples of suitable nitrogen containing compounds include:

$CH_3CONH_2$
$C_{17}H_{35}CONH_2$
$C_3H_6(CONH_2)_2$
$C_3H_6[CON(CH_3)H]_2$
$CO(NH_2)_2$
$CO[N(CH_3)H]_2$
$H_2NCONHCONH_2$ (melamine structure - triazine ring with three NH₂ groups)

(hydantoin-like cyclic structure with two C=O and NH groups)

$H_2N-\overset{\overset{H}{N}}{\underset{\|}{C}}-NH_2$ $CH_3N-\overset{\overset{H}{N}}{\underset{\|}{C}}-N-CH_3$
$\phantom{CH_3N-}H\phantom{XXX}H$

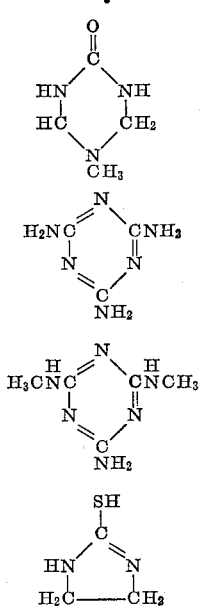

PROCESSES FOR PREPOLYMER PRODUCT PREPARATION

Amido resin prepolymer products of this invention may be prepared by reacting (condensing) under liquid phase conditions a mixture containing an aldehyde, a fluorinated aliphatic compound and a nitrogen containing compound (as these terms are defined above) for a time sufficient to produce a prepolymer product capable of polymerizing to an adherent, continuous film on a polar surface. In such a reaction mixture there is preferably present a molar quantity of aldehyde at least equivalent to the sum of the number of moles of nitrogen containing compound present plus the number of moles of fluorinated aliphatic compound present.

This reaction may be carried out in the absence of a solvent; however, it is usually more satisfactory to add a solvent, remove most or all of any water liberated during condensation by azeotropic distillation, and then carry out the further condensation. Suitable solvents may be water soluble organic solvents free of active hydrogen such as methylethyl ketone or more preferably a water insoluble inert organic solvent such as xylene, bis(trifluoromethyl) benzene, dibutyl ether, etc.

It is convenient and preferred to add an acid catalyst to the reaction mixture. Any acid soluble under the reaction conditions, i.e., soluble in the low-molecular weight amido aldehyde condensate or in the condensate solution, will catalytically promote further condensation. However, acids having an ionization constant in water of less than about $10^{-4}$, such as acetic and formic acid, react slowly and do not lead to a well-cured final product under usual processing conditions. Strong acids, i.e., those that are completely ionized in water, and those that have oxidizing tendencies, such as paratoluenesulfonic acid or sulfuric acid, catalyze the reaction at a reasonable rate at temperatures below about 100° C. It is, however, difficult and expensive to remove all traces of acid from the final product and as a result, coatings or molded products prepared from these strong oxidizing acids tend to become discolored and even to decompose at temperatures above about 150° C., such as would be used, for example, in baking. The most satisfactory acids are those organic acids with an ionization constant in water between about $10^{-4}$ and $10^{-1}$, such as oxalic acid, tartaric acid, lactic acid, and perfluorobutyric acid; and phosphoric acid. Borontrifluoride-ammonia complexes serve as efficient catalysts, but the product becomes yellow at elevated temperature.

The fluorinated aliphatic groups in a prepolymer of the invention may be introduced at several points in a process of making prepolymers. For example, if a relatively high fluorine content in the final prepolymer is desired, e.g., above about 35%, it may be desirable to react the fluorinated aliphatic compound, the aldehyde, and the nitrogen containing compound in the presence of little or no solvent, and to have little or no dilution (as by addition of further aldehyde-nitrogen containing compound condensate). Condensation is continued until the reaction mixture by test displays non-autophobicity as described herein. On the other hand, for prepolymer products having lower fluorine content, e.g., below about 10%, more efficient reactor utilization can generally be obtained by first preparing a condensate containing e.g., 25–30% by weight of fluorine, and subsequently diluting with fluorine-free nitrogen containing compound prior to prepolymer preparation.

When the aldehyde, the fluorinated aliphatic compound and the nitrogen containing compound are simultaneously reacted together, it is convenient and preferred to conduct the reaction in two steps. The first step is conducted at a temperature in the range of from about 25 to 60° C. and is continued until the reactant mass forms a single phase liquid. Then, as a second step, the temperature of the reactant mass is increased to from about 65° to 150° C. for a time sufficient to produce a prepolymer product of the invention.

It will be appreciated that instead of reacting together simultaneously an aldehyde, a fluorinated aliphatic compound, and a nitrogen containing compound that it is convenient and practical to react together two of these components separately and then to react the resulting condensation product with the third or remaining reactant. For example, it is convenient and preferred to react together first an aldehyde compound and nitrogen containing compound to produce a fluorine-free initial condensation product which is then reacted with the fluorinated aliphatic compound. Similarly, the aldehyde and the fluorinated aliphatic compound can be first reacted together to produce a fluorinated aliphatic radical containing condensation product and then such condensation product reacted with the nitrogen containing compound to produce a prepolymer product of the invention.

When the nitrogen containing compound and the aldehyde are pre-reacted, one can obtain an intermediate condensation product which is either unstabilized or stabilized. Stabilized intermediate condensation products are obtained by adding a lower alkanol (especially methanol) to the reaction mixture of nitrogen containing compound and aldehyde.

Examples of unstabilized intermediate condensation reaction products of nitrogen containing compounds and aldehyde (especially formaldehyde) include:

$$CH_3CON(CH_2OH)_2$$

$$C_3H_6[CON(CH_3)CH_2OH]_2$$

$$C_3H_6[CON(CH_3)CH(CH_3)OH]_2$$

$$CO(NHCH_2OH)$$

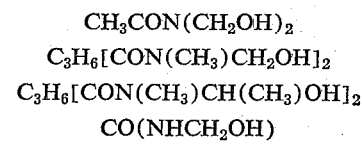

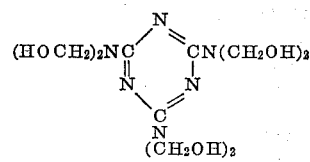

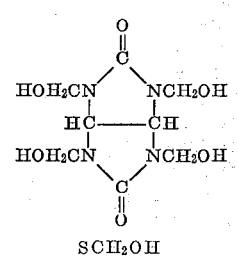

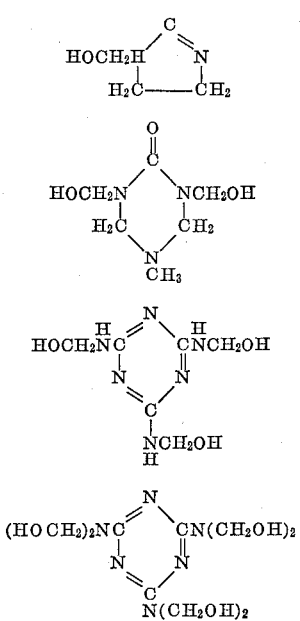

Examples of stabilized intermediate condensation products of an aldehyde (especially formaldehyde) with a nitrogen containing compound in the presence of a lower alkanol (especially methanol) include:

$$CH_3CON(CH_2OCH_3)_2$$

$$C_3H_6[CON(CH_3)CH_2OCH_3]_2$$

$$C_3H_6[CON(CH_3)CH(CH_3)OC_4H_9]_2$$

$$CO(NHCH_2OCH_3)_2$$

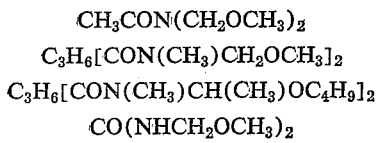

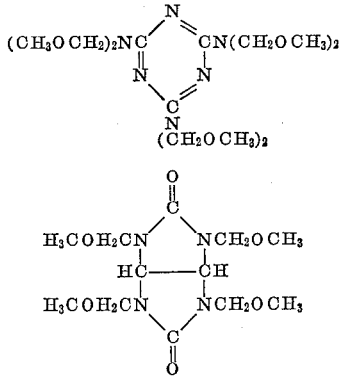

The preparation of prepolymers of the invention can proceed by using any one of a variety of preparative procedures, which are readily understood by refernece to FIG. 1 taken together with the following description:

Novel prepolymers of this invention are designated as composition II in FIG. 1. As indicated above, composition II is derived from the reaction of three basic reactants: an aldehyde, a fluoroalkyl-containing reactant, and a nitrogen containing compound.

As prepared, composition II is in the physical form of a liquid. Solvents may be present. Such solvents may be removed by evaporation under reduced pressure at temperatures below about 75° C. to leave a friable solid (at room temperature) prepolymer product. Composition II thus can be in a solid or liquid form.

The derivation of composition II from such three reactants can follow a variety of pathways as shown in FIG. 1. The various possible pathways are equivalent in the sense that the starting materials are the same and the final product is the same, but the order of combination (reaction) of the reactants, and the intermediates, stable or unstable, which are part of any particular pathway, will differ. Selection of a particular pathway or process in any given instance depends on a number of factors, such as the basic reactant cost and availability, the commercial availability of particular materials, the equipment on hand, type of prepolymer product desired, and the like. For example, melamine (an example of a nitrogen-containing compound) is commercially available at a reasonable price; similarly, hexamethoxymethylmelamine, a reaction product of formaldehyde and melamine stabilized by further reaction with methanol, can be used as the equivalent of a mixture of formaldehyde and melamine in the condensation reaction with the fluoroalkyl-containing compound. Several manufacturing steps can be saved by starting with this intermediate compound to prepare a prepolymer product.

Some of the several equivalent methods of preparation of composition II as shown in FIG. 1 will now be further described. Referring to FIG. 1, circles enclosing a letter indicate a class of starting materials or reactants, circles enclosing a Roman numeral indicate a class of products, and rectangles enclosing an Arabic numeral indicate appropriate conventional reactor equipment, such as a stirred kettle or the like.

The starting materials are as follows:

Letter:                   Starting material or reactant
A ____ Fluorinated aliphatic compound containing active hydrogen.
B ____ Aldehyde.
C ____ Nitrogen containing compound.
D ____ Flourine-free nitrogen containing aldehyde condensate.
E ____ Alkanol.

The products produced from such starting materials using the processes herein described are as follows:

Roman numeral:                 Product
I _____ Low-molecular weight, fluorine-containing, nitrogen containing-aldehyde condensate.
II ____ Prepolymer products of the invention.

Typical exemplary reactors (Arabic numerals 1–9) suitable for use in preparing such products from such starting materials are stirred kettles.

Various conditions under which an aldehyde and nitrogen containing compounds are condensed to form an initial, thermosettable low-molecular weight product are well known in the art. Suitable reactants, reactions, and reaction conditions are described, for example, in the monograph "Formaldehyde," 3rd Edition, by J. Frederick Walker, published by Reinhold Publishing Corporation, New York in 1964, particularly in Sections 7, 8, and 10–14, inclusive.

In general, preparation of composition II requires the use of a quantity of aldehyde which is at least equivalent to the sum of the number of mols of nitrogen containing compound plus the number of mols of fluorinated aliphatic containing reactant. Preferably, the amount of aldehyde used is equivalent to the active hydrogen content of the nitrogen containing compound used, and most preferably in at least 10% excess. It will be appreciated that quantities of aldehyde beyond such 10% excess can be used in practicing processes of the invention, but, in general, as those skilled in the art will appreciate, amounts in excess of about say 125 mol percent of aldehyde (based on the active hydrogen content of the nitrogen containing compound) tend to be wasteful and do not tend to contribute to increasing product yields.

If, as is generally desirable, reactant C contains a plurality of =C—NH groups, and if the fluorine-containing compound is present to only a fraction of the stoichiometric equivalent of the =CNH groups, and further if reactant B is present in an amount stoichiometrically equivalent to or greater than the =CNH content of reactant C, it may be preferred to add a lower alkanol (reactant E), usually methanol, in stoichiometric excess of the formaldehyde, or even to use methanol as solvent for the reaction. The alkanol reacts with the methylol group initially formed to provide an alkoxy alkylidene group (=C—N—CHR—OR', where R' represents the alkyl group of the lower alkanol) which product is relatively stable at ordinary temperatures. Thus, such product can be stored or even shipped from one location to another, with a minimum tendency toward further polymerization until subjected to an elevated temperature usually in the presence of a catalyst. Without the alkanol addition, the intermediate compound tends to polymerize even under ambient storage conditions and makes control of the final state difficult. Only in the case where reactants A, B, and C are reacted in the proportion desired in the final prepolymer product, and where the initial reaction product is to be coated or cast immediately, is it desirable to omit the alkanol. Composition I represents the initial low-molecular weight, fluorine-containing, amido-aldehyde condensate.

The reaction path represented as coming into reactor 7 from the left represents the formation of a fluorine-free amido aldehyde condensate prepared by reacting reactants B and C and usually reactant E to form the fluorine-free amido aldehyde condensate analogous to composition I. It is frequently convenient to prepare composition I with a fluorine content much higher than is necessary or desirable in the final product and then to dilute the initial product, composition I, with fluorine-free material in reactor 7, and to continue reaction to a prepolymer product stage, as further described in the examples, to form composition II.

A second pathway is to react reactants A, B, and C, usually with reactant E, in a reactor 3 to form in one step composition I. The formation of composition I is also symbolized, in another alternative, by the addition of reactants B, C, and, optionally, E, to a reactor 4 to form a fluorine-free amido aldehyde condensate (reactant D), then further to react this material with reactant A in a subsequent reaction, in the same or a different reactor (e.g., 5). An example of this would be the more preferred route in which reactant D represents a material, such as hexamethoxymethylmelamine, which may be prepared in one location and then subsequently reacted with the fluoroalkyl-containing reactant A.

One preferred process, when reacting aldehyde, fluorinated aliphatic containing reactant, and amido compound to product prepolymer products of the invention, involves conducting the reaction between these reactants in two steps. In the first step, one selects an amido compound which contains alkoxyalkylidene radicals. Such amido compound is then condensed with a fluorinated aliphatic compound at a temperature in the range of from about 25 to 60° C. until the reactant mass forms a single-phase liquid. Then in the second step the temperature of such single-phase liquid is increased to temperatures from no more than about 150° C. (e.g., from 65–150° C.) for a time sufficient to produce a prepolymer product of the invention.

While it will usually be more economical to prepare a material corresponding to composition I with a relatively high fluorine content, followed by dilution and partial polymerization to the prepolymer, in some cases, it may be desirable to prepare the nitrogen containing aldehyde condensate corresponding to reactant D, to partially polymerize this material in reactor 9 and to then add the fluorine-containing reactant A to the prepolymerized fluorine-free material to form composition II.

Other equivalent modifications of the process will be apparent to those skilled in the art and may be used where economics or convenience dictate.

In deriving the prepolymer, composition II, from composition I, or in the prepolymerization symbolized as taking place in reactor 9, it is usual (as indicated above) to include an acid catalyst to shorten reaction time.

PREPOLYMER PRODUCTS

An amido resin prepolymer of this invention is characteristically organic solvent soluble, thermosettable, and capable of polymerizing to a continuous, adherent, organic solvent insoluble film on a polar (e.g., water wettable), solid surface.

In general, such a continuous film contains at least sufficient fluorine content chemically incorporated therein in the form of fluorinated aliphatic radicals to produce an oleophobic surface. In general, oleophobicity for purposes of this invention can be demonstrated by conventional measurement and comparison of contact angles of hexadecane droplets on the surface at the film/air interface. Thus, the contact angle is determinable by placing a drop of hexadecane on the smooth surface. If the contact angle of the drop of oil is much less than about 30°, the treated surface is considered to be wetted by the oil (i.e., oleophillic) since the oil leaves a perceptible trail. If the contact angle is above about 40°, the treated surface is considered to be oleophobic.

It is preferred to have the fluorine content of an amido resin prepolymer of this invention fall between about 1 and 40% by weight. If the fluorine content of the prepolymer product is above about 40%, it generally becomes difficultly soluble in common organic solvents and, therefore, it is difficult to prepare coating solutions therefrom. If the fluorine content is much less than about 1%, on the other hand, the resulting thermoset amido resin films are generally insufficiently oleophobic.

Since the perfluoroaliphatic compounds are surface active, even relatively low concentrations of fluoroinated aliphatic groups in the mixture result in a relatively high fluorine content at the exposed surface of the cured polymer. When the fluorine content of the mixture, calculated as elementary fluorine, is as low as 1% or even less, the surface of the cured polymer is markedly hydrophobic, i.e., water vapor will condense as discreet droplets rather than as a continuous film. At fluorine contents of about 5% by weight, oleophobic characteristics are also observed; mineral oil or hexadecane will "bead up" on the surface and will show no tendency to spread. For optimum stain resistance and film resistance, a minimum fluorine concentration of about 10% is preferred.

The upper limit of fluorine content is, of course, not critical, but is governed primarily by economics. In general, as low a perfluoroalkyl content as will provide the desired oleophobic and hydrophobic characteristics is used. At fluorine contents above about 35%, solubility in common solvents becomes difficult and above about 40% the material must be used as a melt rather than in solution, or fluorine-containing organic solvents such as methyl perfluorobutyrate are required.

In general, in an amido resin prepolymer product of this invention, the fluorinated aliphatic radicals are bonded by an aldehyde generated alkylidene link to a moiety derived from the nitrogen containing compound.

The term "aldehyde generated alkylidene link" as used herein refers to a divalent radical of the form

where R' is as defined above in Formula 1. Preferably the aldehyde used to generate such link is formaldehyde and the aldehyde generated link resulting is methylene.

The term "moiety derived from the nitrogen containing compound" as used herein refers to a radical obtained by removal of a formaldehyde reactable active hydrogen atom from a nitrogen containing compound.

Typically, owing to the manner in which it is made, the reaction product of the process of the invention is in the form of a complex mixture of materials. Such complex mixture typically includes four distinct classes of polymerizable (thermosettable) components:

(1) fluorinated aliphatic radical-containing low molecular weight prepolymer molecules, (2) unfluorinated low molecular weight prepolymer molecules,
(3) fluorinated aliphatic radical-containing monomeric amido resin compounds, and
(4) unfluorinated monomeric amido resin compounds.

In any given prepolymer product, the respective proportions of each such class of components will vary, depending upon a number of factors, including nature and respective proportions of starting materials, reaction conditions, and the like. Although these components can be isolated, it is not practical to indicate generally the respective proportion of each such component class in a prepolymer product mixture but the fluorinated aliphatic radical containing prepolymer component is generally a major component of the product mixture.

Furthermore, the chemical and physical properties of these respective classes of components in a product mixture are sufficiently similar to one another that qualitative and quantitative identification of these classes in any given product prepolymer mixture is extremely difficult if not impossible. Hence, specific products of the invention are best identified in terms of their bulk properties, as indicated above (e.g., solubility, thermosettability, polymerizing characteristics, fluorine content, etc.). Each molecule of each class of components, however, generally contains at least one functional reactive group available for further condensation during subsequent thermosetting, including both aldehyde reacted and aldehyde reactable groups. Examples of such functional reactive groups include $=\text{CNH}$, $-\text{CH}_2\text{OH}$, $=\text{NCH}_2\text{OH}$, $$-\text{CH}_2\text{OCH}_2\text{OH}$$

$=\text{CNCH}_2\text{OCH}_3$, $-\text{CH}_2\text{OCH}_2-\text{OCH}_3$, and the like. So as to provide a polymerizable prepolymer it is preferred that at least 90% of all the thermosettable molecules present in a given product mixture contain at least two such functional reactive groups as above defined. Of the total number of prepolymer molecules present in a given product mixture, preferably at least 10% thereof contain three or more such functional reactive groups, so as to provide adequate crosslinking in the final thermoset structure. In any given prepolymer product mixture, it will be appreciated that a small fraction of the total number of molecules thereof, preferably not more than about 10%, contain only one such functional reactive group. In general, a given prepolymer product mixture of the invention is so prepared that it contains sufficient numbers of fluorinated aliphatic radical containing low molecular weight prepolymer molecules present therein to produce a continuous, adherent, organic insoluble film, following thermosetting, on a polar solid surface which film is hard, hydrophobic and oleophobic.

Since the distribution of fluorinated aliphatic radicals in a given prepolymer product mixture is determined statistically, there are present therein a few low molecular weight polymer molecules which contain no such functional reactive groups because all available functional reactive groups are completely substituted by a fluorinated aliphatic radical. To minimize the presence of such molecules, it is preferred to employ as starting materials either nitrogen containing compounds which contain 3 or more of such functional reactive groups (e.g., ($=\text{CNH}$) groups reactable with formaldehyde), or fluorinated aliphatic compounds which contain more than one active hydrogen atom, or both.

For general usage it is not necessary to have every prepolymer molecule contain a perfluoroaliphatic radical since the latter will tend to go to the surface and the fluorine-free material will be found within the body of the cured film, or at the substrate surface. Because of the nature of the condensation and prepolymerizing actions, a statistical distribution of the perfluoroaliphatic groups will generally be found. If it is desired to prepare a mixture in which substantially every prepolymer molecule contains at least one perfluoroaliphatic radical, the following method may be used. Into a three-liter, 3-neck round-bottom flask fitted with a reflux condenser and a modified Dean stark return receiver, agitator, and means for heating and cooling, is placed 550 grams of $C_8F_{17}SO_2N(CH_3)CH_2CHOHCH_2OH$. The flask is heated to approximately 60° C., at which temperature the material becomes a mobile molten mass. 7.5 grams of oxalic acid (anhydrous) and 1000 grams of hexamethoxymethylmelamine are added while agitation is continued. The temperature of the melt is then increased not higher than 120° C. until about 63 grams of methanol has been collected in the receiver, at which time further evolution of the condensate becomes very slow.

The flask heater is removed and the mixture cooled to below 100° C. 700 grams of toluene is added. With agitation continued, heat is applied to allow a gentle reflux of the solution for an hour, until a small sample of the solution forms a continuous coating, as previously described. This solution is now ready for use as a coating composition. For some purposes, such as storing and shipping, it may be desirable to recover and store the fluorinated aliphatic-containing prepolymer. This can be done by evaporation of the toluene solvent. The condenser and receiver are replaced by another condenser and receiver suitable for cooling to about −70° to −80° C., as by solid carbon dioxide-acetone refrigerant. The condenser bottom is designed so that the return of condensate to the receiver can be visually observed.

The temperature of the flask contents is reduced to below 35° C.; the pressure of the system is reduced to about 10 mm. Hg or less, and maintained during the ensuing distillation. The temperature is gradually increased as the distillation rate slows., but in no case is the temperature allowed to exceed about 70° C., to avoid further polymerization. Distillation is continued until condensate collection essentially ceases and the flask contents are a white friable solid.

For convenience, the residual prefluoroaliphatic radical-containing prepolymer may be ground to a powder and stored at room temperature or preferably below 10° C. if extended storage is necessary. Coatings can be formed either by uniformly distributing the powder over the object to be coated, followed by fusion and curing, or the material can be redissolved and applied as a coating solution.

By the term "organic solvent soluble," reference is had to the fact that a prepolymer product is substantially soluble in na inert (as respect prepolymer molecules of the invention), common organic solvent. Examples of such common organic solvents include lower alkanols, such as methanol, ethanol, or the like; hydrocarbons, such as xylene, petroleum ether, and the like; ethers, such as methyl hexyl ether and the like; ketones, such as methyl ethyl ketone, and the like; etc. Dilute solutions of a prepolymer product of the invention can be used in the preparation of cured, thermoset products, but it is preferred to employ solutions thereof which contain at least 10 weight percent of a prepolymer product.

By the term "organic solvent insoluble," reference is had to the fact that a thermoset, cured product derived from a prepolymer product mixture of the invention is substantially insoluble in common organic solvents, such as those just above indicated.

The terms "thermoset," "thermosettable," "thermosetting," and like words based on the same root word as used herein, have reference to the fact that aliphatic radical-containing prepolymer molecules of this invention are capable of curing (cross-linking or thermosetting) when heated to temperatures higher than, for example, about 25° C., without addition of further compounds. However, in the event that an acid catalyst has not been added to the reaction mixture during the formation of a prepolymer of this invention, such an acid catalyst may be added during thermosetting (as described below) to increase the rate of thermosetting.

By the term "continuous" as used herein in relation to a thin (i.e., less than about 0.05 cm.) film or coating, reference is had to the fact that a thermoset coating derived from uniformly applied (as for example by a solvent solution) prepolymer mixture on a polar surface covers substantially the entire initially coated portion of such surface with a film of relatively uniform thickness.

Discontinuous coatings are characteristically formed from thermosettable mixtures of reactive low molecular weight fluorine-free and fluorine-containing molecules and represent a major difficulty in the prior art of fluorinated aliphatic radical-containing amido resin coatings which is overcome by this invention. For example, when an alkoxy-nitrogen containing compound such as hexamethoxymethylmelamine, is reacted with a relatively small amount of an active hydrogen-containing fluorinated aliphatic compound, such as omega perfluorooctyl ethanol, in an amount equivalent to about 5% of the methoxymethylene groups present in the nitrogen containing compound, the resulting initial condensation product (which is not a prepolymer product of this invention) typically includes both a substantial fraction of unchanged (or perhaps dimeric) melamine derivative(s) and a small fraction of molecules containing one or at most a few fluorinated aliphatic radicals. When such a mixture is placed on a surface and gently heated, initially the mixture may spread over the surface. Any solvent present will evaporate as heating continues. Then it is observed that the liquid withdraws from the exposed edges of the surface, and, if the surface is relatively large and the coating more than a millimeter or two in thickness, the coating may break up into several individual, generally circular, droplets as heating continues. After final curing, it is found that these droplets are generally only loosely attached to the surface.

It is theorized that this withdrawal phenomenon occurs because the fluorinated aliphatic radical portion of a molecule tends to migrate to the interface between the droplet and the substrate surface, or between the droplet and air, to form a new surface which is fluorocarbon in nature and which, therefore, has little attraction to the substrate surface. In some cases, the low molecular weight fluorine-containing molecules may be preferentially adsorbed on the substrate, thereby exposing the fluorinated aliphatic radical to the remainder of the coating mixture which then may not be able to coat uniformly the low energy surface thus formed. In general, the greater the weight percent of fluorinated aliphatic radical in the initial fluorine containing condensation product, and the lower the total molecular weight of the condensate, the more readily, more rapidly, and more completely is a fluorocarbon film formed on a polar substrate surface.

It has been surprisingly found in this invention that when one continues to heat a reaction mixture including a fluorine-containing initial condensation product beyond the time necessary for a fluorinated aliphatic compound to react with an nitrogen containing compound (as evidenced, for example, by release of, in this illustration, methanol from the reaction mixture as the reaction temperature increases, during which concomitantly the fluorine-free methoxymethylmelamine molecules self-condense), a point is reached at which a small amount of material from the reactant mixture, when spread on a polar substrate surface, dried, and cured, does not show the above-described retraction, but instead remains in place and provides a continuous coating over the entire surface. When this occurs, the reaction mixture contains a prepolymer product of the invention. Such mixture has molecules containing fluorine which have a correspondingly lower fluorinated aliphatic radical content (compared to the monomeric fluorinated materials). Such prepolymer molecules are sufficiently soluble in common organic solvents that the concentration of the fluorinated aliphatic radicals in a prepolymer product mixture coating-polar substrate interface is insufficient to reduce adhesion while, at the air-coating interface, the concentration of fluorinated aliphatic radicals is still sufficiently high to form a fluorocarbon-like surface. The observed result is that a continuous film of fluorinated amido resin can be formed on such a polar substrate surface.

This phenomenon in the prior art of initial spreading of prepolymer over substrate surface followed by subsequent withdrawal or retraction of the film resulting in a discontinuous film formation during curing or even before is termed "autophobicity." In the extreme case, it may involve such a high concentration of fluorine-containing material at the interfacial surfaces of the coating or droplet that the fluorine-containing molecules condense primarily with themselves, and the fluorine-free molecules condense in another separate solid phase, resulting in a nonhomogeneous two-phase solid which is not as preferred as the homogeneous single-phase solid cured coating with a fluorocarbon-like surface.

In general, one can determine when an optimum stage of prepolymer formation is reached by removal of a small sample of reaction mixture from a reaction vessel and testing for autophobicity. Such a test can be conducted by observing visually whether or not, after coating such sample on a polar surface, it retracts during a subsequent drying and curing. If there is retraction, condensation of the reaction mixture is continued until, by this test procedure, there is no such retraction.

By the term "polar" as used herein reference is had to a solid surface which displays a residual attractive force. In general, natural solid surfaces such as wood, metal, glass, porcelain, and fabric, as well as solid surfaces of a synthetic nature, such as phenolic resins, epoxy resins, amino aldehyde resins, etc. are polar.

Sometimes, in coating a polar surface with a prepolymer product of the invention, it is desirable to add thereto a small amount, usually less than about 25% by weight, of another compatible thermosettable resin, such as Bisphenol A-glycidyl ether (epoxy) resin, to improve adhesion of the resulting cured film to the underlying polar surface.

THERMOSET PRODUCTS AND PREPARATION

Thermosetting of prepolymers of the invention is carried out so as to cause the condensation of functional reactive groups. Such condensation results in the liberation of small molecules such as HOH, $CH_3OH$, $CH_2O$, etc.

Although the

linkages by which a fluorinated aliphatic radical is bonded to a prepolymer molecule are labile under the conditions of thermosetting, retention of such groups in a final cross-linked (cured) polymer molecule is achieved because the boiling point of any reversibly formed monomolecular fluorinated aliphatic compound containing active hydrogen has a substantially higher boiling point than water or the lower alkanol compounds or derivatives which preferentially volatilize during thermosetting. If heating during thermosetting is continued for prolonged periods, or at excessively high temperatures, e.g., above about 250° C., further cross linking may take place through loss of the fluorinated aliphatic radicals, which is generally undesirable because of the resulting deterioration of properties in the final thermoset polymer.

Cured (thermoset) polymers of this invention provide coatings or films on polar substrate surfaces which are characteristically hard, hydrophobic and oleophobic. In addition, such polymers are impact resistant, and resilient and have high tensile strength, low elongation, and excellent resistance to cold flow under pressure or at elevated temperatures. They are, particularly when made with an acid catalyst in the preferred strength range (indicated above), thermally stable to temperatures in excess of 200° C. At such temperatures, even when exposure is prolonged, they retain a substantial portion of their initial strength and hardness and resist discoloration.

In general, the fluorine content of a prepolymer or a cure d(thermoset) polymer prepared from a prepolymer or prepolymer product mixture is not critical. However, if less than about 1% by weight of the polymer is fluorine, the surface of a cured polymer will generally have inadequate fluorocarbon properties, that is, such surface will have a low stain resistance, a high wettably by solvents, a high coefficient of friction, etc. In addition, with such low percentages of fluorine the fluorocarbon properties will tend to be transient; for example, exposure to aggressive media such as boiling coffee will result in a gradual conversion of the surface to that of the corresponding base amido resin. On the other hand, if more than about 40% by weight of fluorine is present, the prepolymer tends to be relatively insoluble in common solvents, and perhaps is difficultly soluble even in the corresponding fluorine-free nitrogen containing compound (monomeric or prepolymeric); and, in addition, there is a strong tendency for such prepolymers to produce two-phased cured coatings on polar surfaces.

Preferred thermoset adherent films of this invention are transparent. By the term "transparent" as used herein, reference is had to a composition which transmits at least 85% of perpendicular incident visible light through an optical path of .0025 cm.

ARTICLES OF MANUFACTURE

The uncured prepolymers of this invention can be molded, cast, extruded, and the like into solid shapes and they can be used as coatings for solid substrates having polar surfaces.

When used as such coatings, conventional coating procedures are employed. Thus, coating can be accomplished with or without solvent by spraying, dipping, painting and the like. The thickness of a coating can vary but generally is in the range of from about 0.000025 to 0.25 cm. or more.

Thicker coatings are difficult to cure uniformly in the absence of pressure, and generally confer little benefit. A single coat is usually 0.001 to 0.01 cm.; multiple coats can be applied by air drying (e.g., below about 50° C. until tack-free) successive coats and finally curing the composite coats.

Hardness can generally be improved by increasing the number of cross-links per unit weight of product and by increasing catalyst concentration. Optimum oleophobicity is usually approached with a fluorine content of 10–30% in the cured product.

Air drying to remove solvent is necessary to avoid blistering. Usually 25–50° C. for 10–15 minutes is adequate, as shown by a surface which does not stick when lightly touched.

Curing is usually for 45 minutes at 100° C. to 15 minutes at 150° C. Thicker sections are preferably heated in a press to allow setting without blistering from released gases.

Coatings made from prepolymers of this invention characteristically show resistance to being overcoated by subsequently deposited films and resistance to penetrating stains. Thus, such coatings tend to resist even prolonged and repeated exposure to solutions of hot hot coffeet, hot tea, organic solvents, etc. Moderately strong chemical solutions, such as 10% aqueous hydrochloric acid, sodium carbonate, etc. can be tolerated for intermittant or short duration exposure.

One preferred class of articles of manufacture is dinnerware comprising melamine formaldehyde base coated with a thermoset prepolymer of the invention.

Another preferred class of articles of manufacture comprise those wherein one surface thereof is adapted to have a low coefficient of friction relative to some other (extraneous) surface.

For example, it has been found that the running or ground engaging surface of skis, which have been coated with a prepolymer of the invention which is then thermoset have greatly reduced coefficient of friction on ski slopes compared to the uncoated skis.

It is well known in the art of heat transfer that the maximum rate of heat transfer from a cold surface to a vapor condensing thereon occurs when the condensate forms as small discrete droplets. Condensation as a continuous film effectively produces two additional heat transfer surfaces in a heat transfer system and thereby greatly decreases the efficiency of transfer of heat from the vapor to the cooling medium.

Condensers whose surfaces are coated in accordance with the teachings of this invention have remarkably efficient heat transfer characteristics since condensate on coated surfaces forms as small discrete droplets.

In general, adhesion of solids to the surface formed at the air interface of a cured polymer is poor. For example, baked goods prepared in pans coated with such a coating readily release, and machine surfaces contaminated with adhesive solutions or paint and varnishes readily clean.

Cured coatings derived from prepolymers of this invention on solid substrates having polar surfaces are useful for such purposes as: moisture resistant coatings on electrical units (e.g., semiconductors); chemical resistant coatings for laboratory furniture; dropwise condensation coatings on condenser tubes; low friciton coatings (e.g., skis); release coatings for molds, rollers, paint booths, etc.; protective coating for copper plumbing fixtures (adheres well to copper); oil repellent coating for automobile engines; antifouling coatings for gas transmission lines, chemical reactors, etc.; stain resistant coatings for household appliances, and the like.

Referring to FIG. 2 there is seen a fragment 10 of a coffee cup. The fragment 10 is composed of a melamine-formaldehyde plastic, such as that availabl ecommercially under the trademark "Melmac" of the American Cyanamid Company. This inside faces of this fragment are coated with a thin coating 11 prepared from a prepolymer product of this invention as described in Examples 17 through 22 below. The so-coated article demonstrates excellent resistance to tea filming and coffee staining.

FIG. 3 illustrates a ski body which has been coated with a prepolymer of the invention as described in Example 23 below. Here a metallic ski body 15 has its running surfaces coated with a thin prepolymer coating 16 of the invention which is then dried and cured.

FIG. 4 shows a portion of a condenser tube 20 whose inside surfaces are coated with a thin layer 21 of a dried and cured layer of prepolymer of the invention, as described in Example 24 below. When the tube is used in a heat exchange operation, moisture condenses in the form of drops 22 on the coating 21 demonstrating thereby the superior heat exchange surface produced by cured coatings of this invention.

EXAMPLES

The invention is better illustrated by reference to the following examples:

EXAMPLES 1 THROUGH 16

Preparation of prepolymer

In each of the following examples, a prepolymer liquid mixture is prepared. To prepare prepolymer in each example the following formula is used:

(1) hexamethoxymethylmelamine (30 grams)
(2) reactable fluorinated aliphatic compound
(3) oxalic acid (catalyst) 3 weight percent based on weight of (1) (0.9 gram)

The mole ratio of melamine derivative to fluorinated aliphatic compound is chosen so as to be about 2.26:1. The specific fluoroalkyl compound used in each example is listed in Table I below.

These three starting materials are weighed into an appropriate vessel and heated with agitation until a molten, homogeneous mixture is formed, usually at about 55° C. At this point xylene is added to form a 50 weight percent solids solution and the temperature of the resulting solution is then increased to about 105° C. Component (2) above begins reacting with component (1) above, with the evolution of methanol which is removed as formed.

After the theoretical amount of methanol is removed (as shown by the quantity of methanol condensed from the volatized vapors), there results a mixture containing essentially monomeric fluoroalkyl substituted methoxymethylmelamine.

At this point, the temperature of the reactant mixture is increased to about 130 to 135° C. and maintained there for about ½ hour to promote partial polymerization and thereby to prepare a prepolymer of this invention as evidenced by the elimination of methanol, dimethylether, formaldehyde, and similar low molecular weight condensation products.

A 0.5–1 ml. sample of such reaction mixture is now withdrawn from the reaction vessel and deposited immediately upon the surface of a clean, dry glass coupon having a flat surface of approximately 25 square centimeters. The amount of material thus deposited on the coupon is chosen so as to produce a film after evaporation of solvent which is about 0.0025 to 0.01 cm. thick. The resulting so-coated coupon after such deposition is allowed to air dry at room temperature for 5 to 10 minutes. If during this period it is observed that the film either retracts from the edges of the coated surface of the coupon, or forms uncoated islands within the initially coated surface of the coupon, then heating of the reaction vessel is continued for another 5 to 10 minutes and a similar sample withdrawn therefrom and deposited on a similar glass coupon. This procedure is continued until a sample withdrawn from the reaction vessel produces, when coated on a coupon surface, a continuous film after solvent evaporation. The resulting reaction mass then contains a prepolymer of the invention in solution. The reactants are then allowed to cool to room temperature.

Two samples for coating are now prepared from this reaction product. To one such sample (termed solution A) is added sufficient xylene or other solvent to make up a solution containing about 50 weight percent total solids.

To the other such sample (termed solution B) is similarly added sufficient xylene or other solvent to make up a solution containing about 25 weight percent total solids.

Both solution A and solution B of each prepolymer product, when each is coated upon a polar solid substrate surface, then dried and thermoset, produce a transparent, continuous, adherent, organic solvent insoluble film which is hydrophobic and oleophobic. Such films are useful whenever coatings of hydrophobic and oleophobic cured amido resin polymers are desired.

TABLE I

| Ex. No. | Fluoroalkyl Compound | Weight (gms.) | Prepolymer solution as made | Solution A | Solution B |
|---|---|---|---|---|---|
| 1 | $C_7F_{15}CH_2OH$ | 13.6 | Some slight polymer in flask; colorless. | Slight precipitate forming | Clear. |
| 2 | $C_8F_{17}SO_2N(C_2H_5)(CH_2CH_2OH)$ | 19 | | Some precipitate | Do. |
| 3 | $C_3F_7CH_2OH$ | 6.7 | Clear; water white solution. | Clear | Do. |
| 4 | $C_3F_7CH_2OH$ | 13.4 | ___do___ | ___do___ | Do. |
| 5 | $C_8F_{17}SO_2N(C_2H_5)(CH_2)_{11}OH$ | 23.2 | | ___do___ | Do. |
| 6 | $[C_8F_{17}SO_2N(C_2H_5)(C_2H_4OC(O)N(H)-)]_2C_6H_3CH_3$ | 22 | Some slight insoluble polymer in flask. | Some insoluble gel; resoluble in ethyl acetate. | Slight precipitate; soluble in ethyl acetate. |
| 7 | $C_8F_{17}SO_2NH_2$ | 16.7 | Light straw colored resin | Slight precipitate; clear | Clear. |
| 8 | $C_7F_{15}C(O)N(C_2H_5)(CH_2)_2OH$ | 16.3 | Dark brown solution | Turbid but no precipitate | Slight precipitate. |
| 9 | $C_7F_{15}C(O)N(H)(CH_2)_2OH$ | 15.2 | Dark amber resin | Amber solution; slight precipitate. | Good. |
| 10 | $C_8F_{17}SO_2N(C_2H_5)(CH_2C(O)OH)$ | 19 | Slight precipitate in flask | Much gel in solution | Much precipitate. |
| 11 | $C_8F_{17}SO_2N(CH_3)(CH_2)_3OC(CH_2OH)(H)(C_2H_5)(CH_2OH)(H)$ | 22.7 | Very slight precipitate in flask. | Clear solution | Clear. |
| 12 | $(C_8F_{17}SO_2N(CH_3)(CH_2)_{11}OC(O)N(H)-)_3P^*$ | 26.6 | Slight precipitate in flask | Insoluble resin in xylene | Clear (ethyl acetate). |
| 13 | $C_7F_{15}COOH$ | | Made-up easily; clear resin | Solution in ethyl acetate | Clear. |
| 14 | $(C_8F_{17}SO_2N(CH_3)CH_2OC(O)N(H)-)_3P^*$ | 23 | Light straw color; slight precipitate in resin flask. | Light straw solution in ethyl acetate. | Do. |

TABLE I.—Continued

| Ex. No. | Fluoroalkyl Compound | Weight (gms.) | Prepolymer solution as made | Solution A | Solution B |
|---|---|---|---|---|---|
| 15 | C$_8$F$_{17}$SO$_2$N(C$_2$H$_5$)CH$_2$C(H)(OH)CH$_2$OH | 20 | | Almost clear solution | Do. |
| 16 | (C$_8$F$_{17}$SO$_2$N(C$_2$H$_5$)C$_2$H$_4$OC(O)N(H)—)$_2$C$_6$H$_3$CH$_3$ | 22 | | Some insoluble material in xylene; solution in ethyl acetate. | |

*P represents the polyvalent aralkylene moiety of the mixture of polymethylene polyphenylisocyanates sold by the Carwin Co. as PAPI.

EXAMPLES 17 THROUGH 22
Coffee Staining

To evaluate certain prepolymer products of Examples 1 through 16 above for use as thermoset coatings on melamine-formaldehyde plastic dinnerware in the prevention of coffee staining, the following procedure is followed:

New dinnerware formed of unglazed melamine-formaldehyde plastic (i.e., that available commercially under the trademark Melmac of the Cyanamid Company) is cut up into pieces about 1.25 cm. wide and 3.8 cm. long.

A sample piece is spray coated with one of the below-indicated prepolymer solutions. The spray coating procedure involves first masking a small area of each sample piece before spray coating so that such uncoated area can be used as a control. Thus, each coated sample piece contains its own control area. The resulting so-coated sample piece is then placed into an oven and heated at 140° for 30 minutes to cure (thermoset) the prepolymer coating.

The results, including appearance of thermoset coating are noted in Table III below.

Next each thermoset sample is tested for coffee staining by immersion into a beaker containing a coffee solution maintained at 80° C. This solution is prepared by taking 32 grams of commercial instant coffee powder and dissolving same in one liter of distilled water. Each coated sample is maintained in the aforeindicated beaker for 72 hours. Thereafter, the sample is removed from the solution, rinsed in water, air dried at room temperature, visually inspected for coffee staining, and rated by the approximate rating scale shown in the following Table II:

TABLE II
Degree of Coffee Staining

| Numerical value: | Color of Stain |
|---|---|
| −4 | Black. |
| −3 | Near black. |
| −2 | Dark brown. |
| −1 | Deep tan. |
| 0 | Tan-control. |
| +1 | Yellowish tan. |
| +2 | Dark yellow. |
| +3 | Yellow. |
| +4 | Slight yellowing. |
| +5 | No stain. |

Results are noted in Table III below.

The results show that all of the coatings evaluated are stain resistant in this 72 hour, 80° C. test. Observe that the prepolymers used here are prepolymers prepared from di- and polyfunctional fluoroalkyl compounds.

TABLE III

| Ex. No. | Prepolymer of Ex. No. | Coating Notes | Stain Rating |
|---|---|---|---|
| 17 | 6 | Good, excellent with ethyl acetate | +3 |
| 18 | 11 | Good leveling | +1 |
| 19 | 12 | Good from ethyl acetate xylene | +3 |
| 20 | 14 | ____do____ | 1 +4 |
| 21 | 15 | Levels excellently | 2 +2 |
| 22 | 16 | Levels well from ethyl acetate | 3 +3 |

1 But loss in gloss.
2 Badly filmed.
3 Loss in gloss.

EXAMPLE 23
Friction Reduction

A solution of prepolymer prepared as described in Example 15 is diluted to 25% solids with methylisobutylketone and then sprayed in four passes onto the metallic running surfaces of a pair of skis. The coating is cured with heat so as to provide a continuous oleophobic surface.

The resulting skis show a lower coefficient of friction on snow than a conventional well-waxed ski. The thermoset surface treatment shows no sign of lowered efficiency after four days of use in skiing.

EXAMPLE 24

A 2 meter length of stainless steel (type 316) .7 cm. O.D. tubing is formed into a coil 10 cm. in diameter. The outer surface of this coil is spray coated with a 50% by weight solids solution in methylisobutylketone of the prepolymer prepared, as described in Example 15 above to provide a 0.0050 cm. thick dried coating. The coated coil is air dried for 10 minutes, to avoid subsequent blistering, and then thermoset in an oven at 140° C. for 20 minutes.

One end of the coated coil is connected to a source of cooling water, and the other end is connected to a drain, and the coil then inserted into a wide mouth resin flask as a condenser. Water is placed in the resin flask and refluxed continuously over the condenser surface for 90 days. During all this time the vapor condensate on the coil is observed to be in the form of discrete droplets.

When an equivalent clean uncoated stainless steel coil was substituted for the coated coil, the vapors condensed in the form of an essentially continuous film on the cold surface. Thus, the fluoroalkylated cured polymer coating on the stainless steel tubing produces a superior heat exchange surface compared to the surface of the equivalent uncoated heat exchange tube.

I claim:
1. A fluorine-containing organic solvent soluble thermosettable amido resin prepolymer of an aldehyde, a fluorinated aliphatic compound, and a nitrogen containing compound, said fluorinated aliphatic compound containing per molecule both a terminal perfluoroalkyl group and at least one functional group containing an active hydrogen atom, said nitrogen containing compound containing per molecule at least one occurrence of the radical

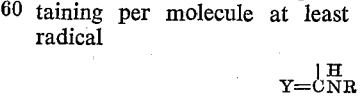

wherein R is selected from the group consisting of hydrogen and aliphatic radicals each containing less than 6 carbon atoms, and Y is selected from the group consisting of trivalent nitrogen of a five-membered heterocyclic ring, trivalent nitrogen of a six-membered heterocyclic ring, and divalent oxygen, said prepolymer being capable of polymerizing to a continuous, adherent film on a polar surface.

2. The prepolymer of claim 1 further characterized by having a fluorine content of from about 1 to 40 weight percent.

3. The prepolymer of claim 1 further characterized by having a fluorine content such that when such prepolymer is polymerized to a continuous film on a surface, such film is oleophobic.

4. The prepolymer of claim 1 wherein said aldehyde has the formula R'CHO wherein R' is selected from the group consisting of hydrogen and organic radicals.

5. The prepolymer of claim 1 wherein said fluorinated aliphatic compound has the formula $$(R_f)_mQ_n[X(H)_p]_r$$

where $R_f$ is a fluorinated aliphatic radical containing a terminal perfluoroalkyly group, Q is a polyvalent linking group, and $X(H)_p$ is selected from the group consisting of hydroxyl, amino, mercapto, carboxyl, carbonamido and sulfonamido, m is the integer 1 or 2, n is the integer 0 or 1, r is an integer of from 1 through 5, inclusive, and p is the integer 1 or 2.

6. The prepolymer of claim 1 wherein said nitrogen containing compound contains at least two occurrences of such radical $$Y=\overset{\overset{H}{|}}{\underset{|}{C}}NR$$

where Y is a trivalent nitrogen atom of a six-membered heterocyclic ring and R is as defined.

7. The prepolymer of claim 1 wherein the aldehyde is formaldehyde and the nitrogen containing compound is melamine.

8. A thermoset polymeric product formed by curing a prepolymer of claim 1.

9. The product of claim 8 wherein said prepolymer is prepared from an aldehyde which has the formula

R'CHO wherein R' is selected from the group consisting of hydrogen and organic radicals.

10. The product of claim 8 wherein said prepolymer is prepared from a fluorinated aliphatic compound which has the formula $$(R_f)_mQ_n[X(H)_p]_r$$

where $R_f$ is a fluorinated aliphatic radical containing a terminal perfluoroalkyl group, Q is a polyvalent linking group, and $X(H)_p$ is selected from the group consisting of hydroxyl, amino, mercapto, carboxyl, carbonamido and sulfonamido, m is the integer 1 or 2, n is the integer 0 or 1, r is an integer of from 1 through 5, inclusive, and p is the integer 1 or 2.

11. The product of claim 8 wherein said prepolymer is prepared from an nitrogen containing compound which contains at least two occurrences of such radical $$Y=\overset{\overset{H}{|}}{\underset{|}{C}}NR$$

where Y is a trivalent nitrogen atom of a six-membered heterocyclic ring and R is as defined above.

12. A process for preparing a fluorine-containing, organic solent soluble, thermosettable, amido resin prepolymer comprising reacting under liquid phase conditions an aldehyde, a fluorinated aliphatic compound, and an nitrogen containing compound for a time sufficient to produce a reaction product capable of polymerizing to a continuous film on a surface, said fluorinated aliphatic compound containing per molecule both a terminal perfluoroalkyl group and at least one functional group containing an active hydrogen atom, said nitrogen containing compound containing per molecule at least one occurrence of the radical $$Y=\overset{\overset{H}{|}}{\underset{|}{C}}NR$$

wherein R is selected from the group consisting of hydrogen and aliphatic radicals each containing less than 6 carbon atoms, and Y is selected from the group consisting of trivalent nitrogen of a five-membered heterocyclic ring, trivavlent nitrogen of a six-membered heterocyclic ring, and divalent oxygen.

13. The process of claim 12 where there is present in such mixture a molar quantity of aldehyde at least equivalent to the sum of the number of moles of nitrogen containing compound plus the number of moles of fluorinated aliphatic-containing reactant.

14. The process of claim 12 wherein the reaction is carried out in two steps, the first step being one in which the nitrogen containing compound contains alkoxyalkylidene radicals and is condensed with said fluorinated aliphatic compound at a temperature in the range from about 25 to 60° C. until the reactant mass forms a single phase liquid, and then the temperature of said liquid is increased to from about 65 to 150° C. for a time sufficient to produce the desired product.

15. The process of claim 12 wherein an acid catalyst is added to the reaction mixture.

16. The process of claim 12 wherein the acid catalyst has an ionization constant of from about $10^{-4}$ to $10^{-1}$.

17. The process of claim 12 wherein said aldehyde and said nitrogen containing compound are first reacted to produce a fluorine-free initial condensation product and then such condensation product is reacted with said fluorinated aliphatic compound.

18. The process of claim 17 wherein an alkanol is added to the reaction mixture when said nitrogen containing compound is reacted with said aldehyde.

19. An article of manufacture comprising a solid substrate having a polar surface coated with a prepolymer product of claim 1.

20. The product of claim 19 wherein the prepolymer coating is cured.

21. The article of claim 19 wherein the substrate is a melamine formaldehyde resin.

22. The article of claim 19 wherein the substrate is wood.

23. The article of claim 19 wherein the substrate is metal.

24. The article of claim 19 wherein the substrate is glass.

25. The article of claim 19 wherein the prepolymer is made from melamine, formaldehyde, and a fluorinated aliphatic compound.

26. The prepolymer of claim 1 wherein said aldehyde is formaldehyde.

References Cited

UNITED STATES PATENTS

| | | | |
|---|---|---|---|
| 2,320,816 | 6/1943 | D'Alelio | 260—72 |
| 2,502,478 | 4/1950 | Dadbury et al. | 260—72 |
| 2,523,470 | 9/1950 | Kropa et al. | 260—72 |
| 3,087,905 | 4/1963 | Fluck | 260—29.4 |
| 3,341,497 | 9/1967 | Sherman et al. | 260—72 |
| 2,777,783 | 1/1957 | Welch | 117—75 |
| 3,037,963 | 6/1962 | Christenson | 260—72 |

OTHER REFERENCES

Chem. Abst. 66: 96175x, American Cyanamid, Shaw.
Chem. Abst. 67: 118056j, Allied Chem. Corp.

WILLIAM H. SHORT, Primary Examiner

E. WOODBERRY, Assistant Examiner

U.S. Cl. X.R.

117—124, 132, 148; 260—17.3, 72, 72.5

PO-1050
(5/69)

UNITED STATES PATENT OFFICE
CERTIFICATE OF CORRECTION

Patent No. 3,510,455    Dated May 5, 1970

Inventor(s) Maynard H. Olson

It is certified that error appears in the above-identified patent and that said Letters Patent are hereby corrected as shown below:

In the specification, Column 3, line 3 should read -- (c) a nitrogen containing compound --.
Column 4, line 59 that portion of the formula reading -CH should read -ĊH .

SIGNED AND
SEALED
AUG 25 1970

(SEAL)
Attest:

Edward M. Fletcher, Jr.
Attesting Officer

WILLIAM E. SCHUYLER, JR.
Commissioner of Patents